United States Patent
Otanez et al.

(10) Patent No.: US 8,935,075 B2
(45) Date of Patent: Jan. 13, 2015

(54) ENGINE START STOP INHIBIT SYSTEM AND METHOD

(75) Inventors: Paul G. Otanez, Troy, MI (US); Shushan Bai, Ann Arbor, MI (US); Vijay A. Neelakantan, Rochester Hills, MI (US)

(73) Assignee: GM Global Technology Operations LLC

( * ) Notice: Subject to any disclaimer, the term of this patent is extended or adjusted under 35 U.S.C. 154(b) by 452 days.

(21) Appl. No.: 13/198,007

(22) Filed: Aug. 4, 2011

(65) Prior Publication Data

US 2013/0035839 A1   Feb. 7, 2013

(51) Int. Cl.
*F02D 28/00* (2006.01)
*F02N 11/08* (2006.01)
*F02D 29/02* (2006.01)
*F02D 41/18* (2006.01)

(52) U.S. Cl.
CPC ............ *F02N 11/0837* (2013.01); *F02D 29/02* (2013.01); *F02D 41/182* (2013.01); *F02N 2200/0801* (2013.01); *F02N 2200/123* (2013.01); *F02N 2200/124* (2013.01); *Y02T 10/48* (2013.01)
USPC ........................ 701/102; 123/179.3

(58) Field of Classification Search
USPC ............... 701/102–104, 110–113; 123/179.4, 123/179.5, 179.16, 179.18, 196 S, 198 D, 123/198 DB, 198 DC, 325, 406.13, 406.14
See application file for complete search history.

(56) References Cited

U.S. PATENT DOCUMENTS

| | | | | |
|---|---|---|---|---|
| 6,580,984 | B2 * | 6/2003 | Fecher et al. | 701/36 |
| 6,708,099 | B2 * | 3/2004 | Tellis et al. | 701/96 |
| 7,121,234 | B2 * | 10/2006 | Schmitz et al. | 123/41.02 |
| 7,548,805 | B2 * | 6/2009 | Yamaguchi et al. | 701/36 |
| 7,601,095 | B2 * | 10/2009 | Hasegawa et al. | 477/180 |
| 8,050,827 | B2 * | 11/2011 | Hasegawa et al. | 701/51 |
| 2001/0025220 | A1 * | 9/2001 | Kaneko et al. | 701/112 |
| 2002/0120374 | A1 * | 8/2002 | Douros et al. | 701/29 |
| 2005/0137766 | A1 * | 6/2005 | Miyakoshi et al. | 701/36 |
| 2006/0106524 | A1 * | 5/2006 | Schmitz et al. | 701/112 |
| 2009/0120710 | A1 * | 5/2009 | Hasegawa et al. | 180/365 |
| 2010/0006365 | A1 * | 1/2010 | Hasegawa et al. | 180/338 |
| 2010/0305838 | A1 * | 12/2010 | Yamamura et al. | 701/113 |
| 2011/0046864 | A1 | 2/2011 | Kamiya | |
| 2011/0106388 | A1 * | 5/2011 | Boeckenhoff et al. | 701/70 |

FOREIGN PATENT DOCUMENTS

CN   102046945 A   5/2011
JP   2004225584   *  1/2003 ............... F02D 29/02

OTHER PUBLICATIONS

Translation of Japan Patent (JP-2004/225584).*

* cited by examiner

*Primary Examiner* — John Kwon
*Assistant Examiner* — Johnny H Hoang

(57) ABSTRACT

A system includes a first module configured to determine at least one of a position of a vehicle, an elevation level of the vehicle and a road grade at the position of the vehicle. A second module configured to inhibit an autostop of an engine including generating a start-stop signal based on the at least one of the position of the vehicle, the elevation level of the vehicle and the road grade at the position of the vehicle. An actuator control module configured to prevent the autostop by adjusting at least one of a spark parameter, a fuel parameter and an air flow parameter of the engine based on the start-stop signal.

20 Claims, 3 Drawing Sheets

ENGINE START STOP INHIBIT SYSTEM AND METHOD

FIELD

The present disclosure relates to engine start-stop systems, and more particularly to systems that inhibit an autostop of an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A start-stop vehicle (sometimes referred to as a stop-start vehicle) includes an internal combustion engine (ICE) and a transmission. If the start-stop vehicle is, for example, a hybrid electric vehicle (HEV) and/or regenerates electrical energy, the start-stop vehicle may also include one or more electric motors. The start-stop vehicle may shut down (deactivate) the ICE to reduce the amount of time the ICE is idling. This improves fuel economy and reduces emissions. The ICE may be shut down (referred to as an autostop) when vehicle speed is less than a threshold for a predetermined period.

During an autostop, an ICE of a start-stop system may be shut down and/or transitioned to an at rest state (i.e. engine speed is equal to 0 revolutions/second). The ICE may be automatically started (referred to as an autostart), for example, when an accelerator pedal is actuated and/or an automatic transmission is transitioned from a drive (D) position. For example, when an accelerator pedal is pushed from an at rest position and/or a shifter of an automatic transmission is transitioned from a drive (D) position to a neutral (N) position, a reverse (R) position, a first gear (D1) position, a second gear (D2) position, etc., an autostart is performed to reactivate the ICE.

SUMMARY

A system is provided and includes a first module configured to determine at least one of a position of a vehicle, an elevation level of the vehicle and a road grade at the position of the vehicle. A second module configured to inhibit an autostop of an engine including generating a start-stop signal based on the at least one of the position of the vehicle, the elevation level of the vehicle and the road grade at the position of the vehicle. An actuator control module configured to prevent the autostop by adjusting at least one of a spark parameter, a fuel parameter and an air flow parameter of the engine based on the start-stop signal.

In other features, a system is provided and includes a first module configured to monitor at least one of a road condition, a traffic condition and a weather condition at a position of a vehicle. A second module is configured to inhibit an autostop of an engine of the vehicle including generating a start-stop signal based on the at least one of the road condition, the traffic condition and the weather condition. An actuator control module is configured to prevent the autostop by adjusting at least one of a spark parameter, a fuel parameter and an air flow parameter of the engine based on the start-stop signal.

In other features, a system is provided and includes a first module configured to monitor driver behavior at the position of a vehicle and store parameters associated with the driver behavior with the positions in a memory. A second module is configured to determine a current position of the vehicle. A third module is configured to inhibit an autostop of an engine of the vehicle including generating a start-stop signal based on the parameters associated with the driver behavior and the current position of the vehicle. An actuator control module is configured to prevent the autostop by adjusting at least one of a spark parameter, a fuel parameter and an air flow parameter of the engine based on the start-stop signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
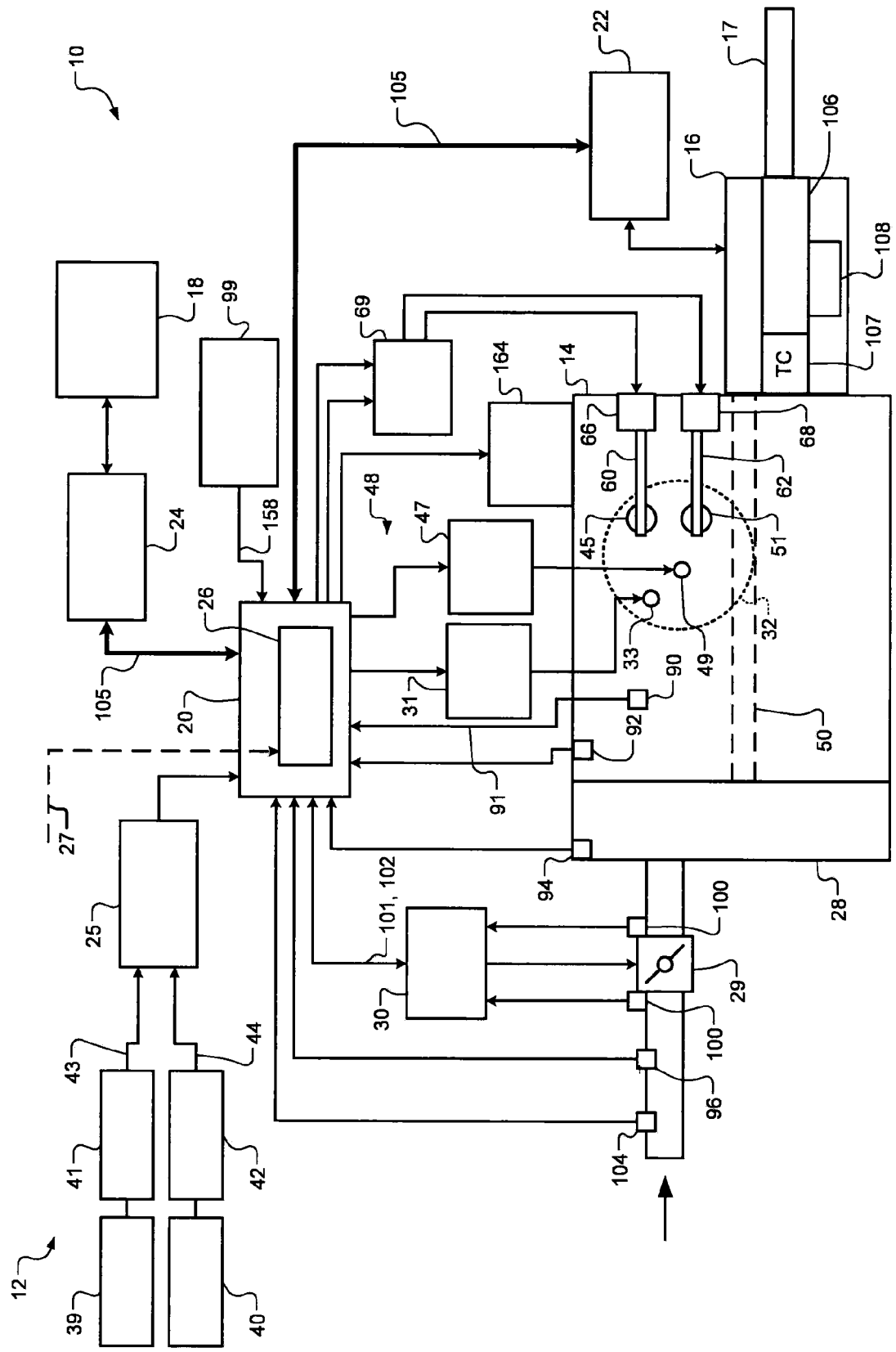
FIG. 1 is a functional block diagram of a vehicle system incorporating a start-stop system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various elements, components, signals and/or modules, these elements, components, signals and/or modules should not be limited by these terms. These terms may be only used to distinguish one element, component, signal and/or module from another element, component, signal and/or module. Terms such as "first," "second," and other numerical terms when used herein do not imply a sequence or order unless clearly indicated by the context. Thus, a first element, component, signal and/or module discussed below could be termed a second element, component, signal and/or module without departing from the teachings of the example implementations.

In FIG. 1, a vehicle system 10 that includes a start-stop system 12 (may be referred to as an inhibit autostop system) is shown. Although the vehicle system 10 is shown as a hybrid electric vehicle (HEV) system, the start-stop system 12 may be applied to other vehicle systems. The vehicle system 10 includes an internal combustion engine (ICE) 14, a transmission system 16, an electric motor and/or generator (motor/generator) 18 which are controlled respectively by an engine control module (ECM) 20, a transmission control module (TCM) 22, and a hybrid control module (HCM) 24. The HCM 24 may be, for example, a belt, alternator, starter (BAS) power inverter module (BPIM). The stop-start control system 12 includes one or more of the control modules 20, 22, 24, a start-stop module 26, and/or other control modules (designated 150 in FIG. 2) of the vehicle system 10. The other control modules 150 may include a body control module. The start-stop module 26 may be part of the ECM 20, part of one of the other control modules of the vehicle system 10, and/or may be a separate control module that communicates with the ECM 20. The start-stop module 26 controls autostarts and autostops of the ICE 14.

An autostart is performed when one or more of a first set of conditions are satisfied. An autostop is performed when one or more of a second set of conditions are satisfied to conserve fuel and provide requested torque to drive a vehicle. The start-stop module 26 may inhibit an autostop when one or more of a third set of conditions are satisfied and/or based on one or more inhibit request signal(s) INHREQ 27. An autostop may be inhibited to enhance vehicle response in certain conditions (e.g., how quickly the vehicle can accelerate based on a torque request). Parameters evaluated when determining whether to perform the autostop may be similar or the same as the parameters evaluated when determining whether to inhibit an autostop. Example parameters are disclosed below. The inhibit request signals INHREQ 27 may be generated by the ECM 20, the TCM 22, the HCM 24, and/or other control modules of the vehicle system 10. The first, second and third sets of conditions and the inhibit request signals are described in more detail below with respect to FIGS. 2 and 3.

The vehicle system 10 and the start-stop system 12 operate in autostart and autostop modes. During the autostop mode, speed of the ICE 14 is decreased and fuel and spark of the ICE 14 are deactivated. During the autostop mode, the ICE 14 will coast down until it is stopped (stalled state). The ICE 14 is deactivated and speed of the ICE 14 is decreased to 0 revolutions/second (rev/s). The speed of the ICE 14 is equal to 0 rev/s when, for example, the crankshaft of the ICE 14 is not rotating. The ICE 14 may be considered shut down when fuel (or fuel system) and spark (or ignition system) are deactivated. During the autostart mode, the ICE 14 may be cranked (crank state) and speed of the ICE 14 may be increased to an idle speed (idle state). Fuel and spark are activated during the autostart mode.

While a spark ignition type engine is described herein, the present disclosure is applicable to other types of torque producers, such as gasoline type engines, gaseous fuel type engines, diesel type engines, propane type engines, and hybrid type engines. The ICE 14 combusts an air/fuel mixture to produce drive torque for a vehicle based on information from a driver input module 25 (e.g., driver input signal DI) and other information described below.

In operation, air is drawn into an intake manifold 28 of the ICE 14 through a throttle valve 29. The ECM 20 commands a throttle actuator module 30 to regulate opening of the throttle valve 29 to control the amount of air drawn into the intake manifold 28 based on, for example, information from the driver input module 25. The ECM 20 commands a fuel actuator module 31 to control the amount of fuel injected into the intake manifold 28, intake runner, and/or a cylinder 32, via for example a fuel injector 33.

The driver input module 25 may be or receive signals from, for example, sensors of a brake actuator 39 (e.g., brake pedal) and/or an accelerator 40 (e.g., accelerator pedal). The sensors may include a brake sensor 41 and an accelerator sensor 42. The driver input signal DI may include a brake pedal signal BRK 43 and an accelerator pedal signal PEDAL 44. Air from the intake manifold 28 is drawn into the cylinder 32 through an intake valve 45. While the ICE 14 may include multiple cylinders, for illustration purposes, the cylinder 32 is shown.

The ECM 20 controls the amount of fuel injected into the intake manifold 28 and/or the cylinder 32. The injected fuel mixes with the air and creates the air/fuel mixture in the cylinder 32. A piston (not shown) within the cylinder 32 compresses the air/fuel mixture. Based upon a signal from the ECM 20, a spark actuator module 47 of an ignition system 48 energizes a spark plug 49 in the cylinder 32, which ignites the air/fuel mixture.

The combustion of the air/fuel mixture drives the piston down, thereby driving a rotating crankshaft 50. The piston then begins moving up again and expels the byproducts of combustion through an exhaust valve 51. The byproducts of combustion are exhausted from the vehicle via an exhaust system. The ICE 14 may be a 4-stroke engine where the piston is cycled iteratively through intake, compression, power/expansion and compression strokes.

The intake and exhaust valves 45, 51 may be controlled by a cylinder actuator module 56 via respective camshafts 60, 62 and cam phasers 66, 68. The cam phasers 66, 68 are controlled via a phaser actuator module 69.

The vehicle system 10 may measure the speed of the crankshaft 50 (engine speed) in revolutions per minute (RPM) using one or more engine position and/or speed sensor(s) 90. The speed sensor 90 may generate an engine speed signal RPM 91. Temperature of the ICE 14 may be measured using an engine coolant or oil temperature (ECT) sensor 92. The ECT sensor 92 may be located within the ICE 14 or at other locations where the coolant and/or oil is circulated, such as a radiator (not shown).

The pressure within the intake manifold 28 may be measured using a manifold absolute pressure (MAP) sensor 94. In various implementations, engine vacuum may be measured, where engine vacuum is the difference between ambient air pressure and the pressure within the intake manifold 28. The mass of air flowing into the intake manifold 28 may be measured using a mass air flow (MAF) sensor 96. The ECM 20 determines cylinder fresh air charge primarily from the MAF sensor 96 and calculates a desired fuel mass using open loop, closed loop and transient fueling algorithms. Fuel injector characterization functions convert the desired fuel mass into an injector on time, which is executed by fuel injector outputs of the ECM 20.

The throttle actuator module 30 monitors position of the throttle valve 29 using one or more throttle position sensors (TPS) 100. Throttle position signals THR1 101 and THR2 102 may be transmitted between the throttle actuator module 30 and the ECM 20. The first throttle position signal THR1 101 may indicate to the ECM 20 and/or the start-stop module 26 position of the throttle valve 29. The second throttle position signal THR2 102 may be transmitted from the ECM 20 to the throttle actuator module 30 to command a throttle valve position. Vehicle speed may be determined via a vehicle speed sensor 99 to generate a vehicle speed signal Vspd. The ambient temperature of air being drawn into the engine system 10 may be measured using an intake air temperature (IAT) sensor 104. The ambient temperature may be determined by the ECM 20 or other control module and indicated via an ambient temperature signal AMB.

The control modules of the vehicle system 10 may communicate with each other via serial and/or parallel connections and/or via a control area network (CAN) 105. For example, the ECM 20 may communicate with the TCM 22 to coordinate shifting gears in the transmission system 16 and adjust reduce torque during a gear shift. As another example, the ECM 20 may communicate with a HCM 24 to coordinate operation of the ICE 14 and the motor/generator 18. The motor/generator 18 may be used to: assist the ICE 14; replace power from the ICE 14, and/or start the ICE 14. In addition, the control modules may share parameter values associated with determining whether to perform an autostart and an autostop and/or whether to inhibit an autostop.

The transmission system 16 includes a transmission 106 and a torque converter 107 and may include an auxiliary pump 108. The auxiliary pump 108 is external to the transmission 106 and maintains fluid pressure within the transmission 106 to maintain engagement of gear(s) and/or clutch(es). For example, a first gear may be held in an engaged state during a neutral idle mode using the auxiliary pump 108. Devices other than the auxiliary pump 108 may be used to maintain pressure, such as an accumulator.

In various implementations, the ECM 20, the TCM 22, the HCM 24 and other control modules of the vehicle system 10 may be integrated into one or more modules.

Figure 2:
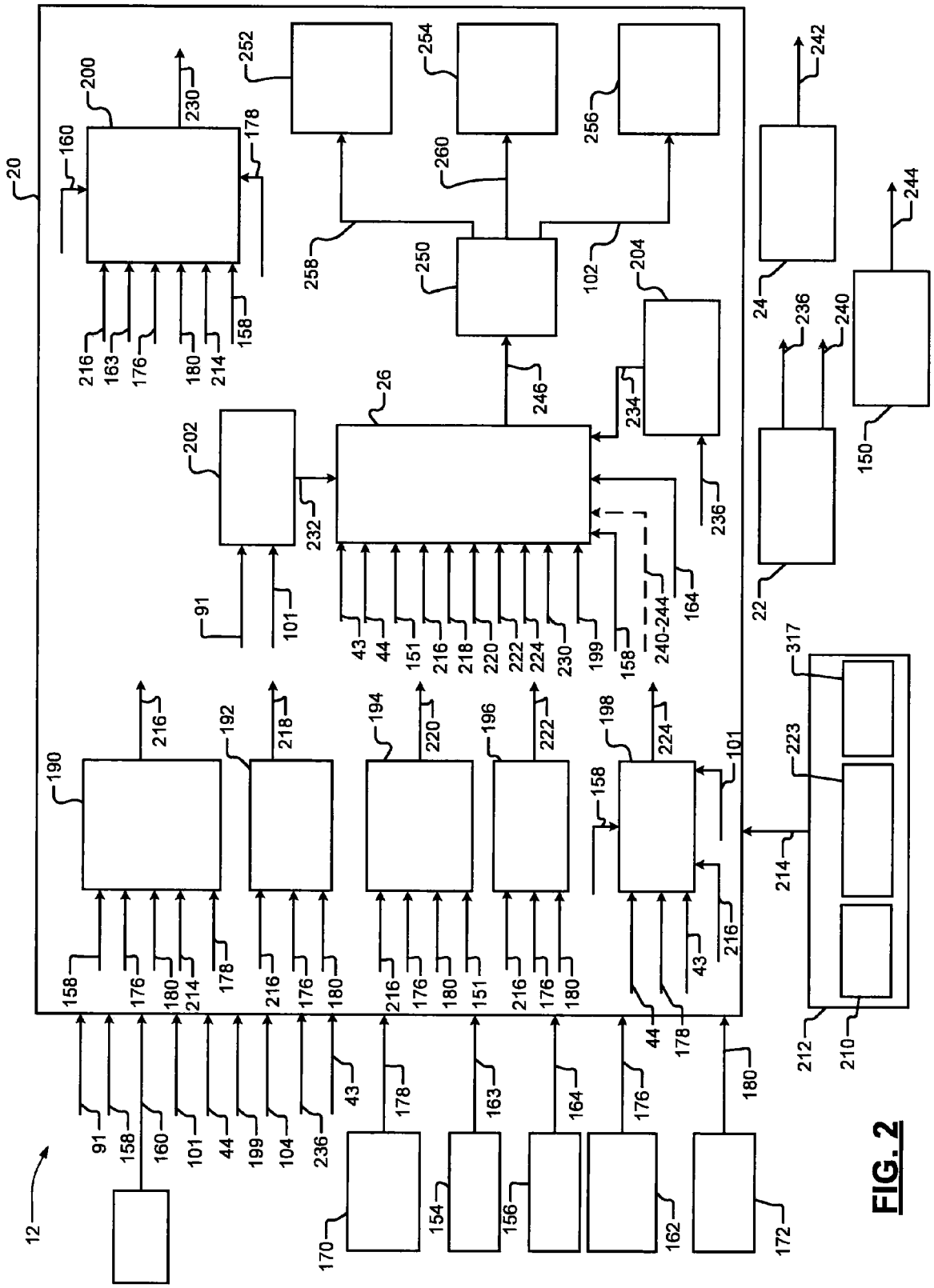
FIG. 2 is a functional block diagram of a start-stop system incorporating an engine control module in accordance with the present disclosure.

Referring now also to FIG. 2, an example of the start-stop system 12 is shown. The start-stop system 12 may include one or more of the ECM 20, the TCM 22, the HCM 24 and the other control modules 150 of the vehicle system 10. The ECM 20 includes the start-stop module 26, which controls autostarts and autostops of the ICE 14. The start-stop module 26 may perform autostarts and autostops based on information received from various sensors, systems and/or modules of the vehicle system 10 and the start-stop system 12. Some of these sensors, systems and modules and corresponding signals are shown in FIG. 2.

The sensors may include, for example, the brake sensor 41, the accelerator pedal sensor 42, the engine speed sensor 90, the vehicle speed sensor 99, the throttle position sensors 100 (or throttle actuator module), the IAT sensor 104, an elevation sensor 152, a road grade sensor 154, and a towing sensor 156. The sensors 41, 42, 90, 99 provide the brake signal BRK 43, the accelerator pedal signal PEDAL 44, the engine speed signal RPM 91 and a vehicle speed signal Vspd 158.

The throttle position sensors 100 may provide throttle position signals which may be received by the throttle actuator module 30 and/or by the ECM 20. The throttle actuator module 30 and/or the ECM 20 may generate the first throttle position signal THR1 101. The IAT sensor 104 may provide the IAT signal to the ECM 20. The ECM 20 may generate an ambient temperature signal AMB 151 based on the IAT signal.

The elevation sensor 152 may generate a first elevation signal (or a pressure signal) ELEV1 160 indicating an elevation level of the vehicle. The elevation level of the vehicle may be estimated based on an air pressure of an environment in which the vehicle is located. The first elevation signal ELEV1 160 indicates the air pressure. Elevation of the vehicle may be alternatively determined by a global positioning system 162. The elevation sensor 152 may not be included when the elevation of the vehicle is determined by the global positioning system 162.

The road grade sensor 154 may be a tilt sensor or an angular position sensor and include one or more accelerometers and gyroscopes. The road grade sensor 154 determines a current road grade of the vehicle and generates a road grade signal TILT 163 to indicate the road grade. The road grade may refer to an incline angle of the road relative to a horizontal or reference plane.

The towing sensor 156 may be a sensor that detects when the vehicle is towing an object, such as a trailer, another vehicle, etc. and generates a towing signal TOW 164. In addition to and/or as an alternative to incorporating a towing sensor in the start-stop system 12, the ECM 20 may detect when an electrical system of a trailer is connected to the vehicle, detect a load on the ICE 14, and/or a state of the transmission 106. The ECM 20 may determine load on the ICE 14 based on throttle position, mass air flow into the ICE 14, spark timing, an amount of fuel supplied, speed of the ICE 14, etc. For example, when the transmission 106 is operating in a towing mode, the ECM 20 may generate a signal: to indicate that an object is being towed; an estimated weight and/or mass of the object; an estimated combined weight and/or mass of the towing vehicle and the object, a estimated weight or mass of the vehicle; and/or a load on the ICE 14. The estimated weight and/or mass of the towing vehicle and the object may be determined based on one or more signals generated by any of the sensors (e.g., the sensors 90, 94, 96, 99, 100, 104, 152, 154, 156) disclosed herein. The stated vehicle and object weights and masses may also be determined based on a determined output torque of the ICE 14.

The systems may include, for example, the global positioning system 162, a cruise control system 170, and/or a telematics system 172. The global positioning system 162 may: wirelessly receive global positioning signals from, for example, satellites and/or base stations; determine a geographical position of the vehicle; and generate a global position signal GPS 176. The global position signal GPS 176 indicates the geographical position. The cruise control system 170 may indicate a current cruise control state (i.e. ON, OFF, a set cruise speed, whether a cruise speed is set, etc.). The cruise control system 170 generates a cruise control signal CCTRL 178 indicating state of the cruise control system 170.

The telematics system 172 may wirelessly receive from satellites and/or base stations security, communication, navigation, safety and diagnostic system information. The telematics system 172 may generates a telematics signal TEL 180 indicating this information to the ECM 20 and/or the start-stop module 26. As an example, the telematics system 172 may provide road, traffic, and weather information to the ECM 20. The road information may include road types (e.g., rural, freeway, expressway, entrance or exit ramp, dirt or paved road, etc.), elevation levels, road grades, speed limits, and/or other road information. The other road information may include road construction or road block information indicating locations with reduced vehicle speeds. The traffic information may include an amount of traffic for a time of day, intersection information, traffic accident information, etc. The weather information may include a precipitation level or percentage, a barometric pressure level, a temperature, whether rain or snow is expected, etc.

The modules of the start-stop system 12 may further include a position module 190, a road characteristic module 192, a weather module 194, a traffic condition module 196, a driver monitoring module 198, an elevation module 200, an engine monitoring module 202, and a transmission monitoring module 204.

The position module 190 may estimate current and future positions of the vehicle and predict a path of the vehicle based on one or more of the signals Vspd 158, GPS 176, CCTRL 178, and TEL 180. Road, traffic, and weather conditions and driver behavior can be determined and/or estimated based on these signals, as described below. The current vehicle position may also or alternatively be determined based on geographical information from a map 210. The map 210 may be stored in memory 212. The memory 212 may generate a map signal GEO 214 indicating the geographical information. The position module 190 generates a position signal POS 216 indicting the current vehicle position, which may be generated based on the map signal GEO 214.

The road characteristic module 192 may determine current road conditions of the vehicle based on one or more of the signals GPS 176, TEL 180, and POS 216. The road conditions may include a road type, an elevation level, a road grade, a speed limit, and/or other road information, as described above. The road characteristic module 192 generates a road signal ROAD 218 indicating the road conditions.

The weather module 194 determines current weather conditions that the vehicle is experiencing based on one or more of the signals AMB 151, GPS 176, TEL 180, and POS 216. The weather module 194 generates a weather signal WTH 220 indicating the current and/or future weather conditions. The weather signal 220 may indicate temperatures, precipitation levels or percentages, barometric pressure levels, whether rain or snow is expected, etc.

The traffic condition module 196 determines current traffic conditions that the vehicle is experiencing and/or future traffic conditions based on one or more of the signals GPS 176, TEL 180, and POS 216. The traffic conditions may include an amount of traffic for a time of day, intersection information, traffic accident information, etc. The traffic condition module 196 generates a traffic condition signal TRF 222 based on the signals GPS 176, TEL 180 and POS 216. The traffic condition signal TRF 222 indicates the determined traffic conditions.

The driver monitoring module 198 monitors current driver behavioral activity and stores driver behavioral information in driver history tables 223 in the memory 212. The driver monitoring module 198 may monitor one or more of the signals BRK 43, PEDAL 44, THR1 101, Vspd 158, TOW 164, CCTRL 178 and POS 216 and generates a driver signal DRV 224 indicating expected driver behavior for current and/or future geographical positions. The behavioral information may include accelerator pedal positions, vehicle acceleration values, vehicle speeds, amounts of time at accelerator pedal positions, amounts of time at throttle positions, amounts of time at brake pedal positions, brake pressures, brake pressure apply periods, cruise control states, power request history of the driver to the drivetrain, etc.

The driver monitoring module 198 may also determine a driver type based on the driver behavioral information and/or based on a driver input received via, for example, the driver input module 25. The driver may select a driver type via, for example, a display, which may be received as an input 199 to the driver input module 25 or ECM 20, as shown. The ECM 20 may receive the driver input from the driver input module 25 indicating a selected driver type. A driver type may be, for example, aggressive, intermediate, economy. If the driver type is aggressive, for example, an autostop may be inhibited to provide an increased amount of available torque. If the driver type is economy, autostops may be performed more often to conserve fuel. The driver type may be indicated via the driver signal DRV 224.

The elevation module 200 determines current elevations and/or estimates future elevations (i.e. predicts elevations) of the vehicle based on one or more of the signals Vspd 158, ELEV1 160, TILT 163, GPS 176, CCTRL 178, TEL 180, GEO 214 and POS 216. The elevation module 200 generates a second elevation signal ELEV2 230 to indicate the current and future elevations.

The engine monitoring module 202 monitors states of the ICE 14 including, for example, engine speed and throttle position. The engine monitoring module 202 may generate an engine signal ENG 232 based on the signals RPM 91 and THR1 101.

The transmission monitoring module 204 monitors states of the transmission and generates a first transmission status signal TRANS1 234. The transmission monitoring module 204 may generate the first transmission status signal TRANS1 234 based on a second transmission status signal TRANS2 236 from the TCM 22. The first transmission status signal TRANS1 234 may indicate: a current gear of the transmission 106; whether the transmission 106 is operating in a tow mode; a load on the transmission 106; etc. The load on the transmission 106 may be determined, for example, based on an engine speed, torque profiles of the ICE 14 and transmission 106, and/or outputs of one or more strain and/or pressure sensors.

The start-stop module 26 performs and/or requests that autostarts and autostops be performed and/or that autostops are inhibited based on signals from the above described sensors, modules and systems. For example, the start-stop module 26 may perform the autostarts, autostops and/or inhibit the autostops based on one or more of the signals BRK 43, PEDAL 44, TOW 164, POS 216, ROAD 218, WTH 220, TRF 222, DRV 224, ELEV2 230 and TRANS1 234 and/or based on one or more of inhibit request signals $INHREQ_{1-3}$ 240, 242, 244. The start-stop module 26 generates a start-stop signal SS 246 to perform and/or request that an autostart or an autostop be performed and/or that an autostop be inhibited.

The inhibit request signals $INHREQ_{1-3}$ 240-244 may be received from control modules, such as the TCM 22, the HCM 24, and the other control modules 150. The TCM 22 may generate the first inhibit request signals $INHREQ_1$ 240 based on, for example, a current gear of the transmission 106, whether the transmission 106 is operating in a tow mode, a load on the transmission 106, etc. As an example, when a shifter of the transmission 106 transitions from a drive (D) position to a neutral (N) position, a reverse (R) position, a first gear (D1) position, a second gear (D2) position, etc., the TCM 22 may request that an autostop be inhibited and/or that an autostart be performed.

The HCM 24 may generate the second inhibit request signal $INHREQ_2$ 242 based on, for example, a state of charge of a power source (e.g., a battery pack), a state of a power source regeneration process, a state of the motor/generator (e.g., whether there is a fault associated with the motor/generator), etc. As an example, the start-stop module 26 may inhibit an autostop when the charge (or a power level) on the power source is less than a predetermined level and/or when there is a fault associated with the motor/generator 18.

The start-stop module 26 may also determine whether the vehicle is towing an object based on the towing signal TOW 164 and/or based on other towing related information. The other towing related information may include: an engine load; whether an electrical system of a trailer is connected to the vehicle; a load on the transmission; a vehicle speed; fuel levels of the cylinders of the ICE 14; air flow levels of cylinders of the ICE 14, spark timing, throttle position, etc. The start-stop module 26 may inhibit an autostop when the vehicle is in a towing mode (i.e. towing an object). In one implementation, the start-stop module 26 inhibits an autostop when the vehicle is towing an object that weighs more than a predetermined weight. The weight of the object may be estimated by the start-stop module 26 and based on the towing related information, an input from the vehicle operator, and/or a signal from a trailer being towed.

Although the modules 190-200 are shown as part of the ECM 20, any of the modules 190-200 may be incorporated in the TCM 22, the HCM 24, the other control modules 150, and/or other modules of the start-stop system 26. Information generated by the modules 190-200 may be transmitted from the TCM 22, HCM 24 and other control modules 150 to the start-stop module 26.

Also, systems external to the ECM 20 may perform one or more of the above described tasks of the modules 190-200 and provide the associated information to the ECM 20, the start-stop module 26 and/or a module of the ECM 20. As an example, the cruise control system 170 may receive position information from the global positioning system 162 and/or the telematics system 172 and/or access the map 210 in the memory 212 to determine the position information. Based on the position information and the state of the cruise control system 170, the cruise control system 170 may estimate a geographical position of the vehicle and predict future positions and speeds of the vehicle. This information may be provided to the start-stop module 26 and/or the position module 190.

The ECM 20 further includes an actuator control module 250, a spark control module 252, a fuel control module 254 and a throttle control module 256. The actuator control module 250 may perform autostarts, autostops and/or inhibit (prevent) autostops based on the start-stop signal SS 246. The actuator control module 250 generates one or more of a spark control signal SPARK 258, a fuel control signal FUEL 260 and the second throttle signal THR2 102 based on the start-stop signal SS 246. The spark, fuel and throttle control modules 252-256 may adjust fuel, air flow, and spark parameters for each of the cylinders of the ICE 14 in response to the signals SPARK 258, FUEL 260, THR2 102. The fuel parameters may include, for example, fuel injection quantity, fuel injection pressure, fuel injection timing, etc. The air flow parameters may include air volumes, air pressures, etc. The spark parameters may include, for example, spark energy and spark timing.

Figure 3:
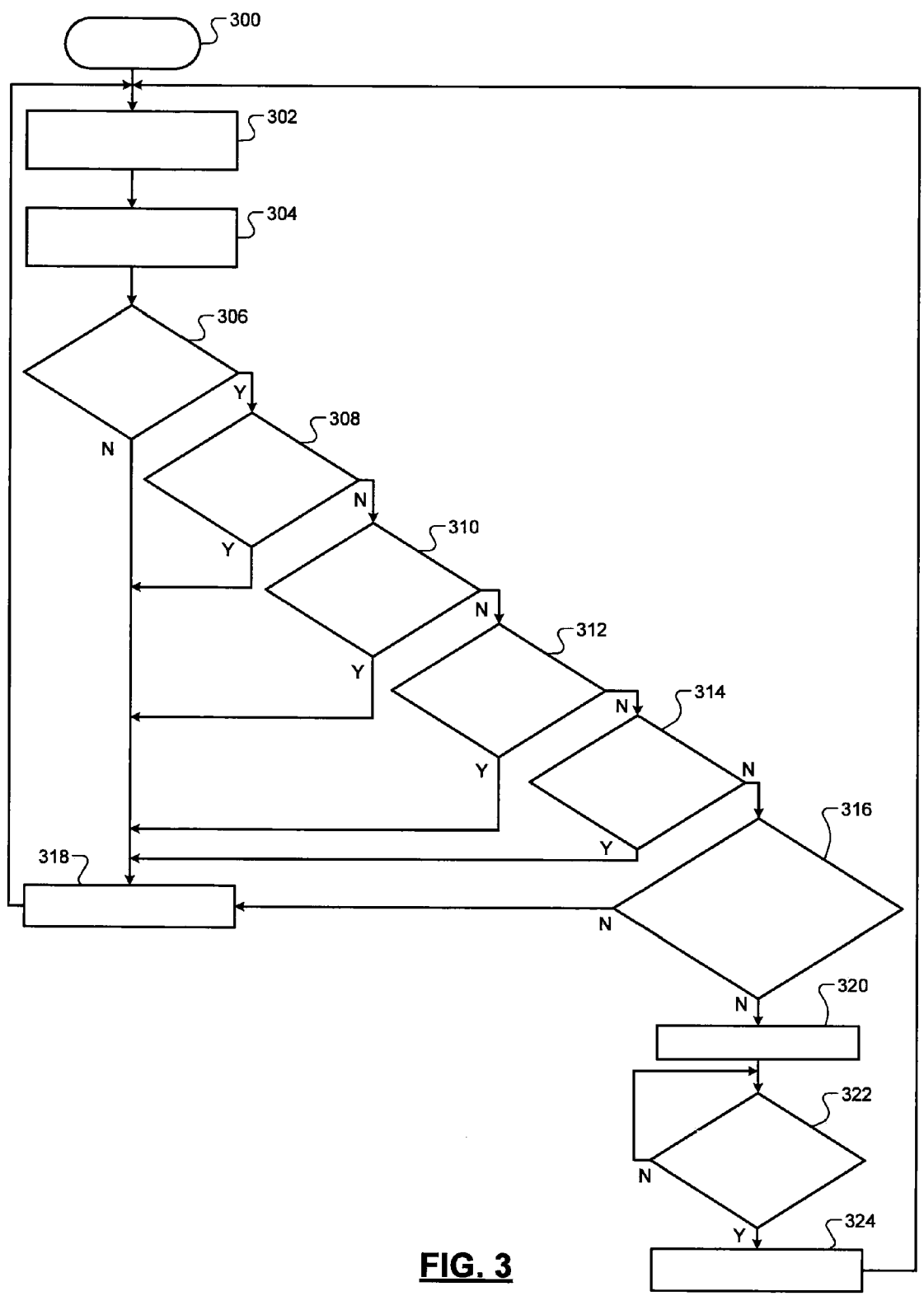
FIG. 3 illustrates a start-stop method in accordance with the present disclosure.

The vehicle system 10 and the start-stop system 12 of FIGS. 1 and 2 may be operated using numerous methods, an example method is provided by the method of FIG. 3. In FIG. 3, a start-stop method is shown. Although the following tasks are primarily described with respect to the implementations of FIGS. 1 and 2, the tasks may be easily modified to apply to other implementations of the present disclosure. Also, although a certain number of conditions are described with respect to the following tasks, the method may incorporate other conditions disclosed herein when determining whether to perform an autostart or an autostop and/or to inhibit an autostop. The tasks may be iteratively performed. The method may begin at 300.

At 302, sensor signals are generated as described above. The sensor signals may include, for example, the signals RPM 91, Vspd 158, ELEV1 160, THR1 101, PEDAL 44, BRK 43, IAT 104, TILT 163, and/or TOW 164. At 304, the cruise control system, the global positioning system and the telematics system may generate the signals CCTRL, GPS, and TEL, as described above.

At 306, the start-stop module 26 may determine whether an inhibit request signal (e.g., inhibit request signals $INHREQ_{1-3}$) has been received from a control module of the vehicle system 10. The TCM 22 may generate an inhibit request signal based on a current gear of the transmission 106, whether the transmission 106 is operating in a tow mode, a load on the transmission 106, etc., as disclosed above. The HCM 24 may generate an inhibit request signal based on a state of charge of a power source (e.g., a battery pack), state of a power source regeneration process, state of the motor/generator 18 (e.g., whether there is a fault associated with the motor/generator 18), etc., as disclosed above. Task 308 is performed when an inhibit request signal is not received, otherwise task 318 is performed.

At 308, the position module 190 may determine current and estimate future geographical positions of the vehicle. Task 310 may be performed when the vehicle is in predetermined geographical positions, otherwise task 318 may be performed. Alternatively, the position module 190 may determine whether a current position and/or an estimated future position are associated with inhibiting an autostop. If the current position and/or the estimated future position is associated with inhibiting an autostop task 318 may be performed, otherwise task 310 may be performed.

At 310, the elevation module 200 determines current and/or future elevation levels of the vehicle, as described above. If one or more of the elevation levels exceeds a first predetermined threshold and/or is outside a first predetermined range, task 318 is performed, otherwise task 312 is performed.

At 312, the road characteristic module 192 may determine current and/or future road grades of the vehicle, as described above. If one or more of the road grades exceeds a second predetermined threshold and/or is outside a second predetermined range, task 318 is performed, otherwise task 314 is performed.

At 314, the start-stop module 26 may determine a towing state of the vehicle and/or whether the vehicle is towing an object associated with inhibiting an autostop. For example, if the weight of the towed object exceeds a third predetermined threshold, task 318 is performed, otherwise task 316 is performed.

At 316, the start-stop module 26 determines whether one or more of the current and/or future road, traffic and/or weather conditions, driver history and/or driver type are associated with (i.e. indicate) inhibiting an autostop. The start-stop module 26 generates the start-stop signal SS 246 indicating whether an autostop is to be inhibited. Task 318 is performed when an autostop is inhibited. Task 320 is performed when an autostop is not inhibited.

At 316, the start-stop module 26 may compare signals from the sensors 43, 44, 104, the modules 190-204, the systems 154, 156, 162, 170, 172, and/or the driver type (e.g., the driver type signal 199) to various predetermined values and/or conditions stored in other tables 317 of the memory 212 and/or use weighted mathematical functions to determine whether to inhibit an autostop. The weighted mathematical functions may: weight each parameter provided by the sensors 43, 44, 104, the modules 190-204, the systems 154, 156, 162, 170, 172; sum the weighted values; and compare the weighted values to a predetermine values when determining whether to inhibit an autostop.

As a first example, the start-stop module 26 may determine whether to inhibit an autostop based on the driver type and the position of the vehicle. If history of the driver indicates that the driver is an aggressive driver at a current vehicle position and/or that the driver type is simply aggressive, than an autostop may be inhibited by performing task 318. If history of the driver indicates that the driver is a non-aggressive driver and/or the driver type is economy than an autostop is not prevented and task 320 is performed. Driver history at current and predicted future vehicle positions may be stored and accessed to inhibit an autostop when HIGH rates of accelerations (i.e. acceleration rates greater than a predetermined rate) are expected by the driver.

As another example, if traffic levels are HIGH, there is construction, and/or there is an accident, an autostop may be permitted (i.e. not inhibited). Real-time traffic levels (i.e. traffic conditions experienced by the vehicle during a current time period) may be monitored via the telematics system. As yet another example, an autostop may be inhibited when the vehicle is on an entrance ramp or an exit ramp of, for example, an expressway. As yet a further example, if an average vehicle speed of the vehicle and/or other vehicles at a current location of the vehicle is greater than a predetermined threshold or outside of a predetermined range, then an autostop may be inhibited.

As still another example, when a speed limit at a current vehicle position is greater than a predetermined threshold, an autostop may be inhibited. As another example, the start-stop module 26 may further determine or estimate an ambient temperature and/or current weather conditions and inhibits an autostop when the ambient temperature is less than or greater than a predetermined range, it is raining or snowing, etc. Inhibiting an autostop when the ambient temperature is greater than the predetermined range may, for example, aid in preventing the motor/generator 18 from being activated due to operation of air-conditioning in the vehicle.

At 318, the actuator control module 250 inhibits an autostop based on the start-stop signal SS 246. Task 302 may be performed subsequent to task 318. At 320, the actuator control module 250 performs an autostop based on the start-stop signal SS 246. At 322, the start-stop module 26 generates the start-stop signal SS 246 to indicate whether an autostart is to be performed. An autostart may be performed when one or more of various conditions are satisfied. For example, an autostart may be performed when: the accelerator pedal 40 is actuated; actuation of the brake pedal 39 is less than a predetermined percentage of total brake pedal range of travel; a transmission shifter is transitioned from a drive position to another position; voltage of a power source is less than a predetermined voltage; cabin temperature is outside a predetermined range; a control module has a fault; etc.

Task 324 is performed when a condition is satisfied to perform an autostart. At 324, an autostart is performed. The method may end upon completing task 324 or the vehicle system 10 and/or the start-stop module may return to task 302, as shown.

The above-described tasks are meant to be illustrative examples; the tasks may be performed sequentially, synchronously, simultaneously, continuously, during overlapping time periods or in a different order depending upon the application. For example, tasks 306-316 may be performed in any order.

Also, although the above tasks 306-316 provide a certain number of conditions that are checked by the start-stop module 26 when determining whether to inhibit an autostop, any number of conditions may be checked. Some examples of other conditions are described above with respect to FIGS. 1 and 2. As yet another example, the start-stop module 26 may monitor when the speed of the vehicle (e.g., Vspd) is equal to 0. An autostop may be inhibited when the vehicle speed is equal to 0 when certain conditions arise. Some of these conditions are described with respect to tasks 306-316.

As a further example, average vehicle speeds and grade changes for current and predicted future vehicle positions may be monitored. An autostop may be inhibited based on these changes when a HIGH rate of acceleration is expected from a stopped vehicle position.

The above-described implementations allow a start-stop module to make better decisions when determining whether to perform an autostart and autostop and/or inhibit an autostop. The implementations allow autostops to be more aggressively applied for improved fuel economy. The start-stop module does not need to wait until worst case situations arise to perform an autostop. For example, the start-stop module does not need to wait a predetermined amount of time after a vehicle is stopped to perform an autostop. The start-stop module may predict that the vehicle is to remain stopped based on the parameters monitored (e.g., road, traffic and weather conditions) and perform an autostop based on the prediction.

The implementations enhance driver and vehicle personalization by enabling the vehicle or vehicle system to learn under what conditions (position, elevation, road grade, time of day, etc.) a particular driver expects HIGH rate accelerations when a vehicle is stopped. The vehicle system adjusts when autostops are inhibited to match the driver expectations.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a first module configured to determine at least one of a position of a vehicle, an elevation level of the vehicle and a road grade at the position of the vehicle;
   a second module configured to inhibit an autostop of an engine including generating a start-stop signal based on the at least one of the position of the vehicle, the elevation level of the vehicle and the road grade at the position of the vehicle,
   wherein the second module is configured to
      determine a weight of an object towed by the vehicle based on at least one of a speed of the vehicle and an output torque of the engine, and
      inhibit the autostop when the weight of the object is greater than a predetermined threshold; and an actuator control module configured to prevent the autostop by adjusting at least one of a spark parameter, a fuel parameter and an air flow parameter of the engine based on the start-stop signal.

2. The system of claim 1, wherein the second module is configured to:
  determine whether speed of the vehicle is less than a predetermined speed; and
  inhibit the autostop when at least one of
    the position of the vehicle is in a predetermined position,
    the elevation level of the vehicle is outside a first predetermined range, and
    the road grade at the position of the vehicle is outside a second predetermined range.

3. The system of claim 1, further comprising a global positioning system configured to generate a global positioning signal,
  wherein the first module is configured to determine the position of the vehicle based on the global positioning signal.

4. The system of claim 1, further comprising a telematics system configured to generate a telematics signal,
  wherein the first module is configured to determine at least one of the position of the vehicle and the elevation level of the vehicle based on the telematics signal.

5. The system of claim 1, further comprising:
  a third module configured to determine the position of the vehicle;
  a fourth module configured to determine the elevation level of the vehicle; and
  a fifth module configured to determine the road grade at the position of the vehicle,
  wherein the second module is configured to inhibit the autostop
    based on the position of the vehicle, the elevation level of the vehicle and the road grade at the position of the vehicle, and
    in response to (i) the elevation level of the vehicle being outside a first predetermined range, and (ii) the road grade being outside a second predetermined range.

6. The system of claim 1, further comprising a third module configured to monitor at least one of a road condition, a traffic condition and a weather condition at the position of the vehicle,
  wherein the second module is configured to inhibit the autostop based on the road condition, the traffic condition and the weather condition.

7. The system of claim 1, further comprising a third module configured to monitor driver behavior at the position of the vehicle and store parameters associated with the driver behavior with the position in a memory,
  wherein the second module is configured to inhibit the autostop based on the parameters associated with the driver behavior and the position of the vehicle, and
  wherein the parameters associated with the driver behavior include an accelerator pedal position, a time at the accelerator pedal position, a brake pedal position and a time at the brake pedal position.

8. The system of claim 1, wherein the second module is configured to:
  determine the weight of the object based on the speed of the vehicle and the output torque of the engine; and
  inhibit the autostop in response to the weight of the object being greater than the predetermined threshold.

9. The system of claim 1, wherein the second module is configured to:
  determine whether the position of the vehicle matches a predetermined position;
  if the position of the vehicle matches a predetermined position, determine whether the elevation level of the vehicle is in a predetermined range;
  if the elevation of the vehicle is in the predetermined range, determine whether the road grade is greater than a second predetermined threshold;
  if the road grade is greater than the second predetermined threshold, determine whether the weight of the object is greater than a predetermined weight;
  if the weight of the object is greater than the predetermined weight, then inhibit the autostop of the engine; and
  if the weight of the object is less than or equal to the predetermined weight, inhibit the autostop of the engine based on a traffic condition, a weather condition, a driver history, or a driver type.

10. A system comprising:
  a first module configured to monitor at least one of a traffic condition and a weather condition at a position of a vehicle;
  a second module configured to inhibit an autostop of an engine of the vehicle including generating a start-stop signal based on the at least one of the traffic condition and the weather condition; and
  an actuator control module configured to prevent the autostop by adjusting at least one of a spark parameter, a fuel parameter and an air flow parameter of the engine based on the start-stop signal.

11. The system of claim 10, further comprising a third module configured to determine the position of the vehicle, wherein:
  the first module is configured to determine the traffic condition and the weather condition based on the position of the vehicle; and
  the second module is configured to inhibit the autostop of the engine including generating the start-stop signal based on the traffic condition and the weather condition.

12. The system of claim 10, further comprising a third module configured to determine an ambient temperature,
  wherein the second module is configured to inhibit the autostop of the engine when the ambient temperature is outside a predetermined range.

13. The system of claim 10, further comprising a telematics system configured to generate a telematics signal,
  wherein the first module is configured to determine at least one of the traffic condition and the weather condition based on the telematics signal.

14. A system comprising:
  a first module configured to monitor driver behavior at a position of a vehicle and store parameters associated with the driver behavior with the position in a memory, wherein the parameters stored in the memory provide a history of power demands on a drivetrain by the driver;
  a second module configured to determine a current position of the vehicle;
  a third module configured to inhibit an autostop of an engine of the vehicle including generating a start-stop signal based on the parameters associated with the driver behavior and the current position of the vehicle, wherein the third module is configured to inhibit the autostop of the engine based on the history of power demands; and
  an actuator control module configured to prevent the autostop by adjusting at least one of a spark parameter, a fuel parameter and an air flow parameter of the engine based on the start-stop signal.

15. The system of claim 14, wherein the parameters associated with the driver behavior comprise:
   at least one of an accelerator pedal position and a throttle position; and
   at least one of a time at the accelerator pedal position and a time at the throttle position.

16. The system of claim 14, wherein the parameters associated with the driver behavior comprise a brake pedal position and a time at the brake pedal position.

17. The system of claim 14, wherein the third module is configured to:
   determine an average vehicle speed at the current position of the vehicle; and
   inhibit the autostop when the average vehicle speed is outside a predetermined range.

18. The system of claim 14, wherein the third module is configured to:
   determine an amount of change in a road grade for a path of the vehicle; and
   inhibit the autostop when the amount of change in the road grade exceeds a predetermined threshold.

19. The system of claim 14, wherein the third module is configured to:
   determine a weight of an object towed by the vehicle based on at least one of a speed of the vehicle and an output torque of the engine; and
   inhibit the autostop when the weight of the object is greater than a predetermined threshold.

20. The system of claim 14, wherein:
   the first module is configured to monitor a traffic condition and a weather condition at the position of the vehicle; and
   the second module is configured to inhibit the autostop of the engine of the vehicle including generating the start-stop signal based on the traffic condition and the weather condition.

* * * * *